United States Patent Office 2,961,847
Patented Nov. 29, 1960

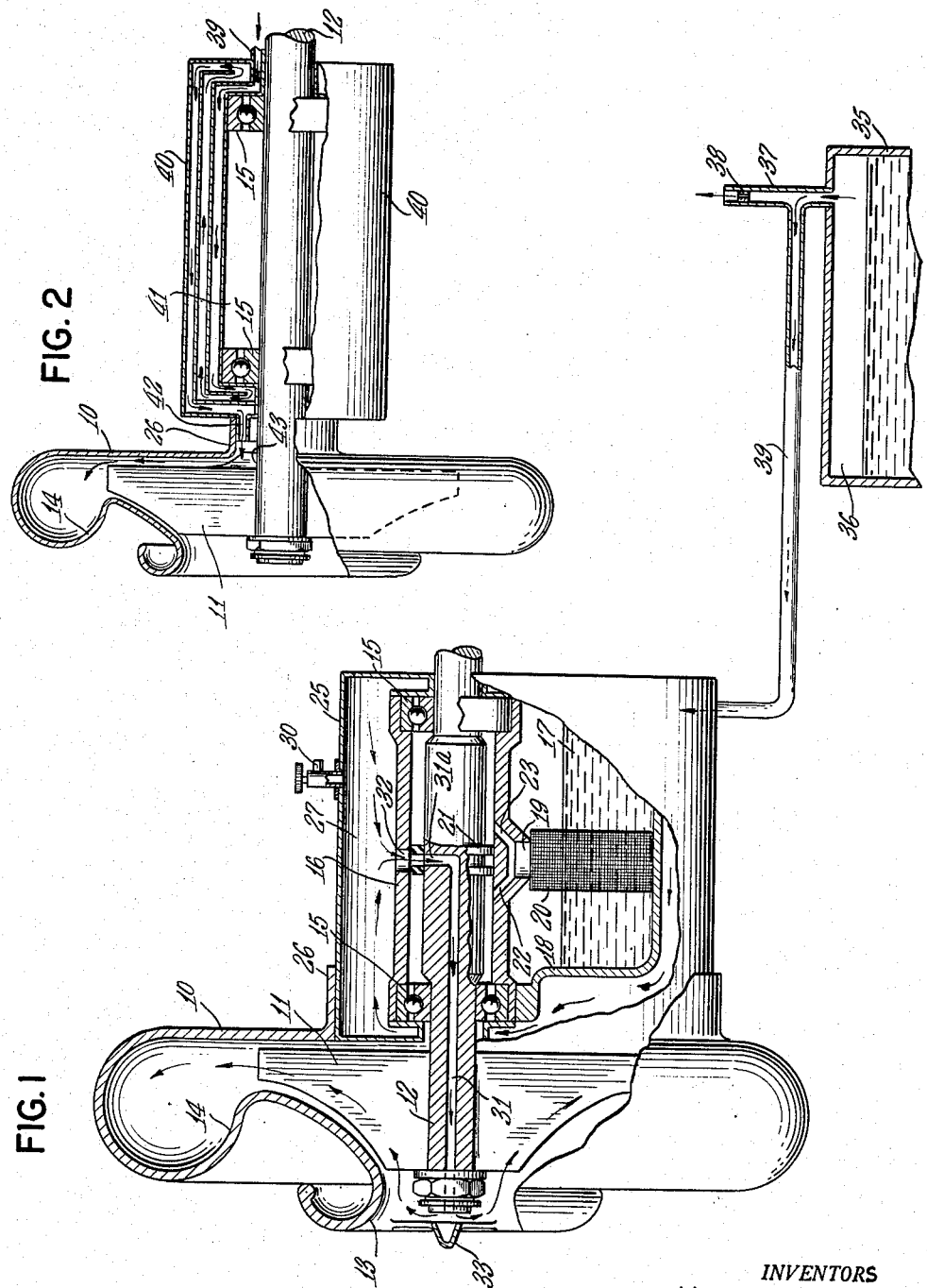
INVENTORS
Vernon L. Whitney, Jr.
BY   John L. Weiler
ATTORNEYS

2,961,847

HIGH ALTITUDE COOLING SYSTEM

Vernon L. Whitney, Jr., Lindenhurst, and John L. Weiler, Freeport, N.Y., assignors to Fairchild Engine and Airplane Corporation, Bay Shore, N.Y., a corporation of Maryland Filed May 7, 1957, Ser. No. 657,584

11 Claims. (Cl. 62—268)

This invention relates to cooling systems for machinery installed in aircraft which operate at high altitudes.

In fast traveling aircraft which operate at high altitudes it is not unusual for the skin temperatures of the craft to reach and exceed 350° F. One of the problems presented in such aircraft is that of efficiently cooling the bearings of the machinery and the lubricant for the bearings which are exposed to or in proximity to such high temperatures. These aircraft may be equipped with steam or vapor generators which, provided the water or other liquid therein is in communication with the low ambient pressure of the aircraft at high altitude, will generate vapor at a temperature which at some altitudes may be as low as or lower than 100° F. Since the temperature differential between the vapor generated at high altitudes and the operating temperature of the bearings and/or lubricant therefor is so great, it is entirely feasible to use the vapor as a coolant for the bearings and the lubricant at high altitudes.

The principal object of the present invention is to provide an efficient cooling system for machinery in aircraft operating at high altitudes by utilizing steam or other vapor generated at a pressure substantially less than normal atmospheric pressure as a coolant.

This and other objects of the present invention are achieved in the cooling system of the present invention by utilizing a vapor generator, the vapor region of which is in communication with the substantially low ambient pressure of the aircraft at high altitude, to supply the vapor generated at a relatively low temperature (at least in comparison to the temperature at which the vapor would be generated at normal atmospheric pressure) to a jacket or heat exchanger wherein the vapor is in heat exchange relationship with the bearings or lubricant to be cooled. The system also includes means for effectively circulating the vapor through the jacket to afford the proper cooling action.

For a complete understanding of the present invention, reference may be had to the detailed description which follows and to the accompanying drawings in which:

Figure 1 is an elevation view, partly in cross-section, illustrating the cooling system of the present invention; and Figure 2 is a view similar to Figure 1 illustrating an alternative embodiment of the invention.

In the drawings, the cooling system of the present invention is illustrated as applicable to a centrifugal compressor, and particularly for cooling the bearings in which the compressor shaft rotates, as well as the lubricant for the bearings. It is, of course, understood that the invention is applicable to other types of machines as well.

Referring to Figure 1 of the drawings, a conventional centrifugal compressor is shown as comprising a circular housing 10 for a plurality of blades 11 supported on a rotating shaft 12. The gaseous medium to be compressed enters the housing axially through an inlet passage 13 and is discharged tangentially from the housing 10 through a discharge passage 14. The compressor shaft 12 extends beyond the housing 10 where it is supported in bearings 15. The shaft extension and the bearings are surrounded by a cylindrical hollow cartridge 16 into and through which a lubricant 17 is supplied to the bearings from the sump or reservoir 18. The reservoir 18 for the lubricant is situated below the hollow cartridge 16, and the lubricant is supplied from the reservoir or sump 18 to the interior of the cartridge via a tube 19 which depends from the center of the cartridge into the reservoir 18. A screen 20 surrounds the depending tube in order to filter the lubricant admitted thereto.

It may be noted that the shaft 12 carries thereon a pair of sealing rings 21 spaced apart to provide an annular passage therebetween surrounding the outer periphery of the shaft. The object of the seals 21 will be apparent below, but at this time it may merely be mentioned that the upper end of the tube 19 communicates with the interior of the cartridge 16 on both sides of the seals 21 via passages 22 and 23. Although it is not important insofar as the present invention is concerned, the lubricant may be lifted through the passage 19 and into the interior of the cartridge 16 by various means, such as, for example, by raising the pressure within the sump 18, by inserting a wick within the tube 19 with the upper ends thereof split so that they may be accommodated within the passages 22 and 23, or by a device similar to that disclosed in the copending application of Lovelock et al., Serial No. 598,911, filed July 18, 1956, now Patent No. 2,861,848.

In order to cool both the bearings and the lubricant effectively, the cartridge 16 and the reservoir 18 for the lubricant are entirely surrounded by a jacket 25 which is affixed to a flange 26 of the compressor housing. The jacket 25 defines a chamber 27 therein which is isolated from both the bearings 15 and the lubricant, but, nevertheless, the coolant within the chamber 27 is in heat exchange relationship with the bearings and the lubricant.

As explained above, when the aircraft is operating at a high altitude and velocity, steam or other vapor may be utilized as a coolant, provided that the steam or vapor has been generated at a pressure substantially below normal atmospheric pressure at sea level, for the reason that the temperature of the steam or vapor thus generated will be substantially lower than the temperature of the bearings and the lubricant. The steam or vapor will, however, quickly become superheated, thus raising the pressure and temperature within the chamber 27, unless provision is made for circulating it through the chamber 27 of the vapor jacket at a rate fast enough to afford the desired cooling action. Accordingly, a control valve 30 may be provided in the jacket to vent the superheated steam or vapor from the chamber 27. The control valve 30, therefore, provides an effective means of regulating the temperature and pressure within the chamber 27 to maintain the steam or vapor within the chamber at the desired temperature and/or pressure, as well as to afford the desired cooling action of the bearings or lubricant.

When the cooling system of the present invention is applied to a compressor of the type shown, the superheated steam or vapor may be very effectively circulated through the chamber 27 by taking advantage of the action of the compressor itself. This may be accomplished by providing an axial passage 31 through the shaft 12 to conduct the superheated steam or vapor from the chamber 27 to the upstream end of the compressor. A port 32 in the cartridge 16 admits the steam or vapor into the space between the annular sealing rings 21 which have been referred to above. These sealing rings prevent the vapor from gaining access to the reservoir 18 for the lubricant. The inlet 31a to the axial passage 31 through the shaft 12 also communicates with the space between the annular seals 21, so that the steam or vapor may be drawn from the chamber 27 to the upstream end of the compressor by the suction of the compressor. In order to prevent the flow of the fluid to be compressed from entering the discharge end of the passage and thereby impeding the flow of the fluid through the passage in the opposite direction, a tapered shield 33 is provided in the inlet 13 of the compressor just upstream of the discharge end of the passsage 31. The steam or vapor discharged into the inlet 13 of the compressor will intermingle with the fluid to be compressed and be carried off through the discharge line 14 of the compressor. In this way the steam or vapor is circulated through the chamber 27 at a rate which prevents excessive pressures and temperatures from building up therein. The valve 30, of course, may be used in conjunction with the means above described for insuring the proper circulation of the steam or vapor. Also, it is obvious that in lieu of a hand operated valve 30, an automatic safety valve may be substituted. This valve could sense either pressure or temperature in the jacket 25 and could combine the safety feature of a normal blow-off valve should the automatic control malfunction.

The vapor generator 35 will be herein described as a steam generator, although it is understood that the vapor supplied to the chamber 27 may be a vapor other than steam. The steam generator comprises a heated chamber into which the water to be vaporized is fed. A vapor region 36 is formed within the upper portion of the chamber above the level of the liquid, and the vapor region 36 communicates with the ambient pressure through a vent 37. In order to restrict the amount of steam vented through the passage 37, a restricted orifice 38 is interposed therein. The orifice 38 will cause the pressure within the vapor region 36 to be maintained at a somewhat higher level than the ambient pressure, but this pressure is nevertheless substantially lower than normal atmospheric pressure at sea level. The steam evolved in the vapor region 36 is conducted to the chamber 27 within the jacket 25 by means of a conduit 39, and this steam is circulated through the chamber 27 in a manner described above.

An alternative embodiment of the present invention is shown in Figure 2 of the drawings. In this embodiment, an annular labyrinthed steam jacket 40 surrounds the shaft 12 and the bearings 15, with the hollow interior 41 of the jacket forming a reservoir for the lubricant. The steam is generated in the manner described above in connection with Figure 1, and it follows a devious path through the labyrinthed jacket, ultimately being discharged into the annular passage 42 which communicates with the interior of the compressor housing just behind the compressor blades 11. While the steam is circulating through the labyrinthed jacket 40, it is in heat exchange relationship with the lubricant and the bearings to absorb heat therefrom. The desired circulation of the steam through the labyrinthed passage is attained in part by the auxiliary blades 43 which are formed on the reverse side of the blades 11. The blades 43 draw the superheated steam from the discharge passage 42 of the labyrinthed jacket 40 into the housing 10, and the steam within the housing 10 moves outwardly by centrifugal force so that the steam is ultimately discharged through the discharge line 14 of the compressor.

From the foregoing description, it is apparent that the steam-filled jackets 25 and 40, in addition to serving as an enclosure for a coolant, also have an insulating effect to prevent heat from being readily transmitted to the bearings and the lubricant. Thus, heat will not be as readily transmitted from the skin to the bearings and the lubricant.

The invenion has been shown in preferred forms and by way of example only, and obviously many variations and modifications may be made therein without departing from the spirit of the invention. The invention, therefore, is not to be limited to any specified form or embodiment, except in so far as such limitations are set forth in the claims.

We claim:
1. A cooling system operable at high altitudes comprising a heat exchanger wherein the coolant is brought into heat exchange relationship with the object to be cooled, a vapor generator having liquid and vapor regions therein, means for venting the vapor region to ambient pressure, thereby causing the liquid to boil at a temperature substantially lower than the boiling point of the liquid at normal atmospheric pressure at sea level, means for conducting vapor from the vapor region to the heat exchanger wherein the vapor serves as the cooling medium, a discharge passage in the heat exchanger for conducting the vapor therefrom, and means in communication with said discharge passage for inducing a flow of the vapor through the heat exchanger.

2. A cooling system as set forth in claim 1 including means defining a restricted passage in said vent means.

3. A cooling system for the bearings of a rotary shaft of an apparatus installed in an aircraft capable of operating at high altitudes comprising a heat exchanger enclosing the bearings in which a coolant is brought in heat exchange relationship with the bearings of the apparatus, passage means for introducing the coolant into the heat exchanger, and a vapor generator including a vapor evolving chamber for the liquid to be vaporized, said chamber including a liquid region and a vapor region in the upper portion of the chamber above the level of the liquid, and vent means connecting the vapor region with the relatively low ambient pressure, whereby vapor evolved in the vapor region of the vapor generator at a temperature substantially lower than the boiling point of the liquid at normal atmospheric pressure is introduced into the heat exchanger through said passage means wherein it serves as the cooling medium.

4. A cooling system as set forth in claim 3 including a discharge passage for exhausting the vapor from the heat exchanger, and valve means for controlling the rate of flow of the vapor through said discharge passage.

5. A cooling system as set forth in claim 3 characterized in that the heat exchanger is a labyrinthed jacket surrounding the parts to be cooled.

6. A cooling system as set forth in claim 3 including a plurality of blades carried by the rotary shaft for inducing a flow of vapor from said heat exchanger.

7. In combination with a centrifugal fluid displacing apparatus having a blade carrying shaft which rotates in bearings, a cooling system for the apparatus comprising a heat exchanger for the introduction of a coolant therein, passage means for admitting the coolant into the heat exchanger, passage means communicating with the blades for discharging the coolant from the heat exchanger, a vapor generator having liquid and vapor regions therein, and vent means for venting the vapor region with a source of pressure substantially lower than normal atmospheric pressure, whereby vapor evolved in the vapor region of the vapor generator at a temperature substantially lower than the boiling point of the liquid at normal atmospheric pressure is introduced into the heat exchanger through said passage means wherein it serves as the coolant.

8. In combination with an apparatus having a shaft which rotates in bearings, a cooling system for the apparatus comprising a heat exchanger wherein a coolant is brought into heat exchange relationship with the bearings and lubricant therefor, passage means for introducing the coolant into the heat exchanger, a vapor generator including a vapor evolving chamber for the liquid to be vaporized, said chamber including a liquid region and a vapor region in the upper portion of the chamber above the level of the liquid, vent means connecting the vapor region with a source of pressure substantially lower than normal atmospheric pressure, whereby vapor evolved in the vapor region of the vapor generator at a temperature substantially lower than the boiling point of the liquid at normal atmospheric pressure is introduced into the heat exchanger through said passage means wherein it serves as the cooling medium, a hollow housing within said heat exchanger and surrounding the shaft to isolate the vapor from the lubricant for the bearings, a passage through said shaft for conducting the vapor from the heat exchanger, a pair of spacially separated sealing rings surrounding the shaft, the space between the sealing rings communicating with the passage through the shaft, and a port in said hollow housing for admitting vapor from the heat exchanger into the passage through the shaft.

9. A cooling system as set forth in claim 8 including means for drawing said vapor through said passage through the shaft.

10. In an apparatus having a shaft supported for rotation in bearings, a cartridge surrounding the rotatable shaft, a reservoir for a lubricant, and passage means connecting the reservoir to the interior of the cartridge through which the lubricant is supplied to one of its bearings, a cooling system operable at high altitudes comprising a housing at least partially enclosing the reservoir, the shaft and the cartridge, a vapor generator, passage means for conducting vapor evolved in the vapor generator to the housing in which the vapor is in heat exchange relationship with the bearings for the shaft and the lubricant, and a discharge passage through which the vapor is withdrawn from the housing.

11. A cooling system as set forth in claim 10, including means for inducing a flow of the vapor through the discharge passage.

References Cited in the file of this patent

UNITED STATES PATENTS

| | | |
|---|---|---|
| 1,979,525 | Bauman | Nov. 6, 1934 |
| 2,157,409 | Helfrecht | May 9, 1939 |
| 2,249,882 | Buchanan | July 22, 1941 |
| 2,604,500 | De Koning | July 22, 1952 |
| 2,740,267 | Bayard | Apr. 3, 1956 |
| 2,743,384 | Turner | Apr. 24, 1956 |
| 2,793,506 | Moody | May 28, 1957 |